United States Patent
Bossert

[15] 3,698,738
[45] Oct. 17, 1972

[54] GOLF CART SEAT

[72] Inventor: Norman K. Bossert, 712 Alicante Drive, Lodi, Calif. 95240

[22] Filed: July 14, 1971

[21] Appl. No.: 162,455

[52] U.S. Cl. ............280/150 R, 280/DIG. 6, 297/217
[51] Int. Cl. ........................A47b 13/02, B60r 27/00
[58] Field of Search..........280/150 R, 47.19, DIG. 6; 297/217

[56] References Cited

UNITED STATES PATENTS

| | | | |
|---|---|---|---|
| 3,162,461 | 12/1964 | Krell | 280/47.19 |
| 2,610,072 | 9/1952 | Head | 280/DIG. 6 |
| 2,673,589 | 3/1954 | Kunkel | 280/DIG. 6 |
| 2,777,707 | 1/1957 | Cloes | 280/DIG. 6 |
| 3,633,519 | 1/1972 | Nichol | 297/217 |

FOREIGN PATENTS OR APPLICATIONS

| | | | |
|---|---|---|---|
| 730,590 | 3/1966 | Canada | 280/DIG. 6 |

Primary Examiner—Benjamin Hersh
Assistant Examiner—Robert R. Song
Attorney—Robert G. West et al.

[57] ABSTRACT

Coaxially mounted on a wheel of a cart used to carry a golfer's clubs is an outwardly projecting stub shaft on which is swingably mounted a pendulum member carrying on its lower end a mass tending gravitationally to maintain the pendulum in a vertical attitude. The pendulum includes an upwardly extending limb on which is flexibly mounted, in cantilevered manner, a seat spaced from and at least partially overlying the top of the wheel. As the golfer sits down on the seat, the seat is deflected downwardly into engagement with the top of the wheel. The top of the wheel not only supports the seat but also acts as a fulcrum causing the cantilevered seat to lift the pendulum out of contact with the stub shaft, thereby assuring that all of the golfer's weight is imposed on the wheel and none on the stub shaft.

7 Claims, 9 Drawing Figures

PATENTED OCT 17 1972

INVENTOR.
NORMAN K. BOSSERT
BY Lothrop & West
ATTORNEYS

PATENTED OCT 17 1972 3,698,738

INVENTOR.
NORMAN K. BOSSERT

BY
Lothrop & West
ATTORNEYS

GOLF CART SEAT

The invention relates to improvements in seats for golf carts.

The market place and the patent literature are replete with golf cart chairs and seats of many different kinds. Many are quite complicated and expensive, and can feasibly be sold only as a part of the original equipment assembled at the factory. Others must be "custom-made" in the sense that they can be installed only on certain brands of carts owing to the fact that they will only fit on certain special arrangements of the various fixed and foldable supporting strut members. So also, in all cases where the seat is to be supported by the cart's framework of struts and braces, the weight of an adult golfer compels a construction of considerable strength and cost.

Even in the case of ground-supported devices, as disclosed in L. F. Lyons U.S. Pat. No. 2,599,928 dated June 10, 1952; H. L. Krell U.S. Pat. No. 3,162,461 dated Dec. 22, 1964; and R. Scheinwald U.S. Pat. No. 3,343,869; or wheel-supported seats, as in B. Kunkel U.S. Pat. No. 2,673,589 dated Mar. 30, 1964, rather complicated and expensive fittings are required.

It is therefore an object of the present invention to provide a golf cart seat which is wheel-supported yet which can readily be adapted to fit substantially all makes of carts.

It is another object of the invention to provide a golf cart seat which is relatively inexpensive, yet is rugged, durable and reliable.

It is a further object of the invention to provide a golf car seat which can quickly and easily be installed and removed, and is relatively small, light in weight and compact, for convenience in carrying and storage.

It is still a further object of the invention to provide a golf cart seat which can either be an original accessory or, owing to the fact that it can be readily installed even by an unskilled person, acquired at a later time and fitted to a cart.

It is another object of the invention to provide a golf cart seat which does not interfere with folding and unfolding the cart.

It is an additional object of the invention to provide a generally improved golf cart seat.

Other objects, together with the foregoing, are attained in the embodiments described in the following description and illustrated in the accompanying drawings in which.

Figure 1:
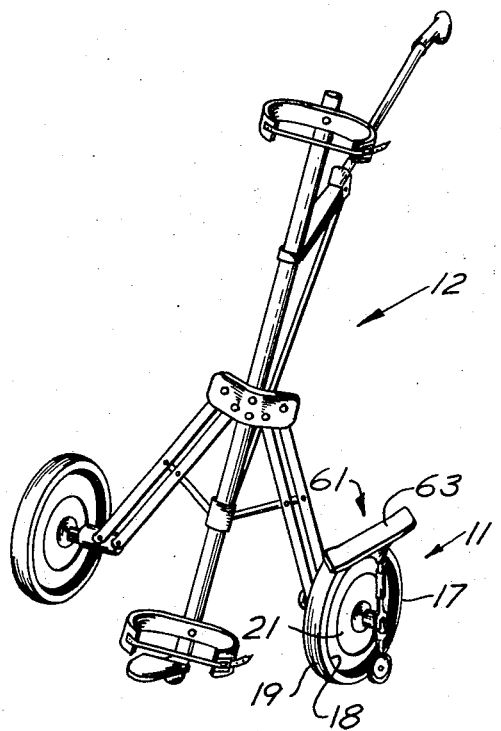
FIG. 1 is a front perspective view to a reduced scale of a golf cart used to carry a golfer's bag, clubs and other equipment, showing a seat installed thereon.

While the golf cart seat of the invention is susceptible of numerous physical embodiments, depending upon the environment and requirements of use, substantial numbers of the herein shown and described embodiment have been made, tested and used, and all have performed in an eminently satisfactory manner.

The golf cart seat of the invention, generally designated by the reference numeral 11, is primarily for use on a two-wheeled cart 12 of the type often used by golfers to carry their bag and clubs, or by mailmen to convey their sacks of mail.

The general construction and operation of this type of cart is well known. The cart therefore requires no explanation except to state that while the wheel mounting structure of different makes of carts varies to an extent, substantially all include a fixed axle, with the wheels, either of the disc or spoke variety, rotatably mounted on the axles. In some cases, the axle ends are exposed and in other instances they are covered by hub caps or wheel covers. In any event, the present seat arrangement is readily mounted on all such types with but small variations in the attaching structure.

In the form of device shown in FIGS. 1, 3, 4 and 6 through 9, the outer end portion of a cart axle 16 has rotatably mounted thereon a wheel 17 including a rim 18 carrying a tire 19 and a disc-shaped wheel cover 21.

Mounted centrally on the wheel cover 21, as by a suitable adhesive, or screw fastening 22 self-tapped into the wheel cover, is a hub member 23 including a right circular cylindrical bar 24 reduced in diameter to provide an annular shoulder 25 and neck 26, or shaft portion, with an outer, head portion 27 of somewhat larger diameter than the neck 26. In the interests of economy, the hub member can be formed of a "plastic" material.

Rotatably mounted on the neck, or shaft, portion 26 of the hub 23, is a pendulum member 30 having a central, enlarged, portion 31 having formed therein an elongated slot 32 defined by an arcuate upper wall 33 and a spaced, parallel pair of linear side walls 34.

The opposite side walls 34 are spaced apart a distance slightly in excess of the diameter of the shaft 26 in order for the pendulum to be freely rotatable on the shaft and translatable with respect thereto. The width of the slot 32 is less, however, than the diameter of the head portion 27 and the thickness of the pendulum is slightly less than the axial length of the neck 26, or shaft. As a consequence, by affording an enlarged opening 36 at the bottom end of the slot 32 large enough to pass over the head 27, the pendulum can be positioned so that the enlarged central portion 31 of the pendulum is journaled on the neck 26, or shaft, with the hub shoulder 25 on the inner side and the head 27 on the outer side of the flattened portion, and the upper arcuate wall 33 of the slot 32 supported by the shaft 26.

Figure 2:
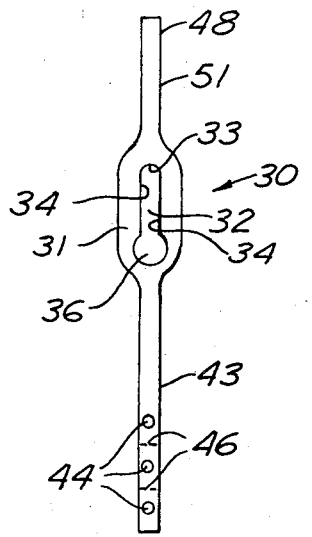
FIG. 2 is a front elevational view of the pendulum rod, per se.

Tending to maintain the pendulum in vertical attitude is a mass 41, of lead, for example, mounted as by a fastening 42 on the lower limb 43 of the pendulum. A plurality of vertically spaced openings 44 allows the mass 41 to be placed at the lowest possible elevation on a variety of wheel sizes. Abscission perforations 46 (see FIG. 2) allow the installer to remove any excess of the lower end of the lower limb 43 protruding below the lead mass (to be removed)by reversely bending two or three times on the abscission line.

The upper end 48 of the upper limb 51 of the pendulum member 31 is snugly inserted into the lower end of a slightly flexible tube 53, of rubber or neoprene material, for example, projecting upwardly and terminating at an upper end 56. The upper portion of the tube 53 carries a seat 61 including a stem 62 inserted snugly into the tube. The seat 61 includes a plate 63 angularly inclined to the stem 62, the plate 63 providing a surface upon which the golfer can be seated when desired.

The seat plate 63 is generally rectangular in configuration, as appears most clearly in FIG. 1, and is elongated in a fore and aft direction parallel to the path of advance of the cart and the general fore and aft plane of the subjacent wheel.

Figure 6:
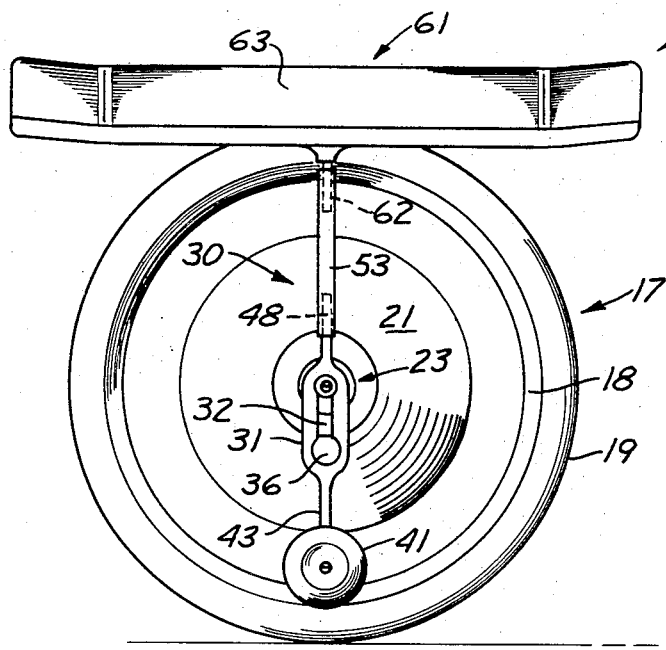
FIG. 6 is a front elevational view of a wheel with the seat installed thereon.
Figure 7:
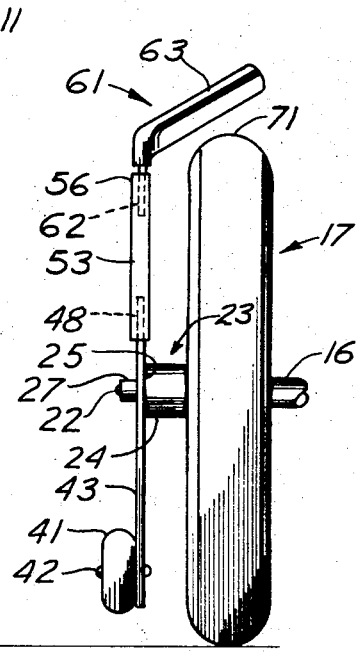
FIG. 7 is a side elevational view of FIG. 6.
Figure 8:
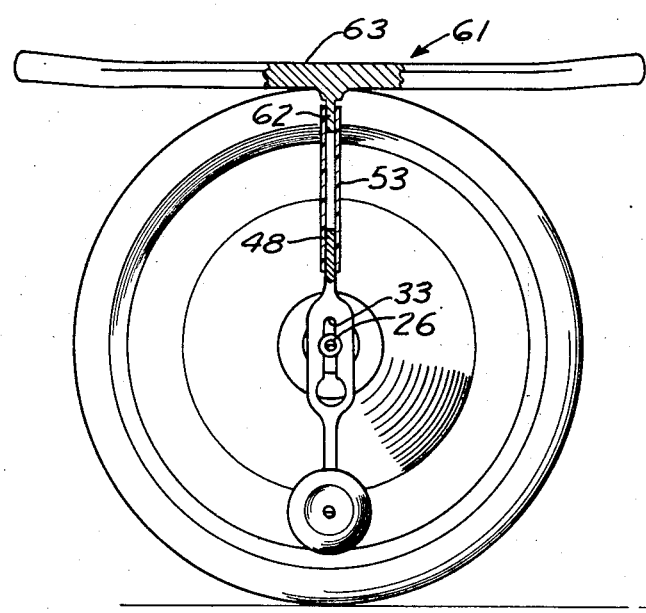
FIG. 8 is a view comparable to FIG. 6 but showing the position of the components with the seat deflected by the user's weight into operating position.
Figure 9:
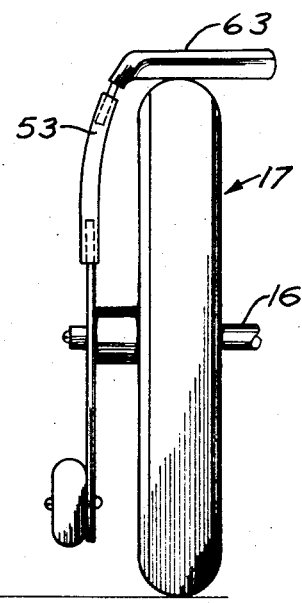
FIG. 9 is a side elevational view of FIG. 8.

When not supporting the golfer's weight, the plane of the seat plate 63 is upwardly inclined from its junction with the upper portion of the tube, as appears most clearly in FIGS. 1, 6 and 7, with the cantilevered seat overlying the major portion of the wheel and being spaced above the wheel (tire) to avoid interference therewith.

In other words, while the cart is moved forwardly over the golf course, the wheel rotates but the pendulum remains in a generally upright posture, but with occasional temporary excursions from the vertical as rough terrain is encountered, the mass, however, always serving under the force of gravity to return the pendulum to the vertical attitude depicted herein.

When the golfer decides to sit down, the cart is brought to rest, preferably in a level location, at which juncture the pendulum assumes the position shown, for example, in FIGS. 6 and 7.

Then, as the golfer sits down on the cantilevered seat plate 63, the superposed weight deflects the seat plate downwardly into engagement with the underlying top portion 71 of the wheel (tire), the top transferring the weight through the rim 18 to the ground 72.

Concurrently, the top portion 71 of the wheel, or a point adjacent thereto, serves as a fulcrum with the cantilevered seat plate as a lever. As a consequence, not only is the upper tube portion flexed, as appears most clearly in FIG. 9, but the tube is also vertically elevated, as shown most clearly in FIG. 8, with the result that the arcuate upper wall 33 defining the upper end of the pendulum slot is lifted above the shaft 26.

After a suitable rest, the golfer stands up and the weight of the lead mass 41, together with the resilience of the tubing 53 restores the components to the transport condition of the parts as shown in FIGS. 1, 6 and 7.

Figure 3:
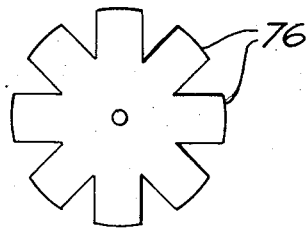
FIG. 3 is a rear elevational view of one form of hub and shaft member.
Figure 4:
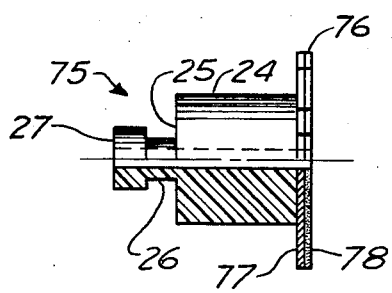
FIG. 4 is a side elevational view of the hub and shaft member of FIG. 3, a portion being shown in section.

FIGS. 3 and 4 disclose a hub member 75 which is substantially identical in most respects to the hub member 23 depicted in FIGS. 1 and 6–9 including the cylindrical portion 24, shoulder 25, neck 26 and head. An important feature of the hub 75, however, is the provision of a star-shaped array of arms 76 (see FIG. 3) mounted on the base of the cylinder 24. The arms 76 are formed by notching a pair of superimposed circular plates, an inner plate 77 of bendable metallic material, such as aluminum, and an outer plate 78 of pressure-sensitive adhesive material protected by a peel cover until ready to use. The FIG. 3 and 4 form of device can be used on many types of wheels, including that shown in FIG. 1. Where the wheel has spokes, the arms 76 can be bent inwardly to engage with the portion of the spokes near the shaft.

Figure 5:
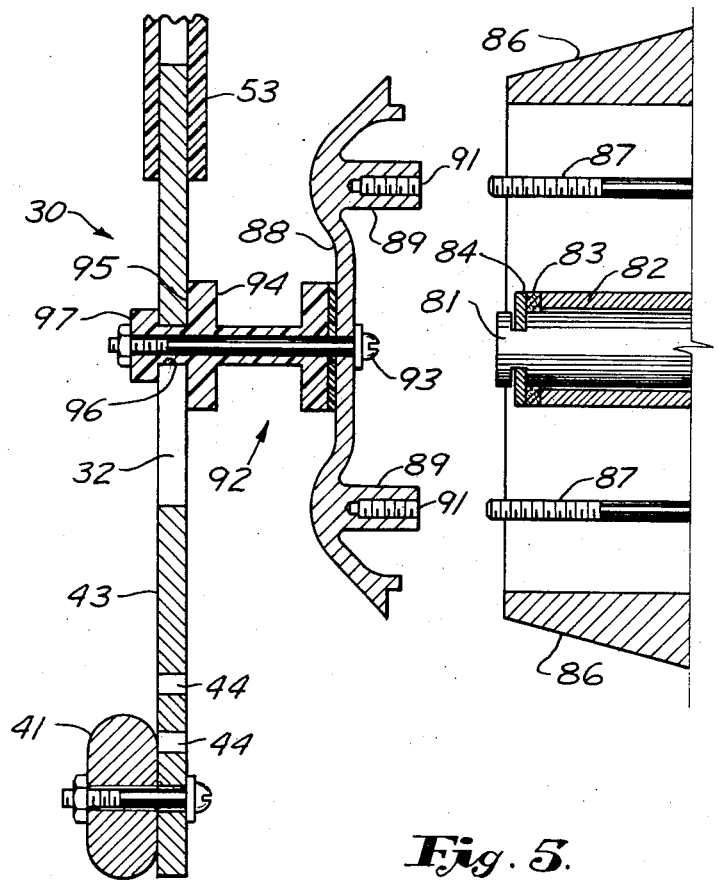
FIG. 5 is a fragmentary exploded sectional view, to an enlarged scale, taken on a median vertical plane, of another form of hub and shaft member.

FIG. 5 illustrates a hub member adapted to fit on another form of wheel mounting. Journaled on a fixed axle 81 is a wheel bearing 82 with annular anti-squeak washer 83 and snap-type retainer ring 84. The wheel carries an outwardly projecting annular ring 86, sculptured in some instances for the sake of appearance, and a pair of screws 87. An ornamental plate 88 carries bosses 89 having tapped, blind openings 91 registering, with the ring 86 and the screws 87, the latter of which can be rotated, as by a screwdriver, from the nether side of the wheel. A hub member 92 is secured to the plate 88 as by a fastening 93. As before, the hub member includes a cylindrical portion 94, annular shoulder 95, a reduced neck 96, or shaft, and a head 97. The pendulum 30 is the same as that previously disclosed and operates with a cantilevered seat, as before, so that the entire weight is supported on the wheel as the golfer is seated.

It can therefore be seen that while different makes of golf carts might benefit from base mounting structures which are at some variance, the FIG. 1, 3, 4 and 6–9 form of hubs fit substantially all carts. Furthermore, the hub, pendulum and seat structure and operation are characterized by a common arrangement which affords a compact, inexpensive, versatile and reliable attachment which can readily and advantageously be installed on every make of golf cart.

What is claimed is:

1. A golf cart seat comprising:
   a. a shaft horizontally mounted on and extending outwardly from a wheel of a golf cart, the axis of said shaft being coincident with the rotational axis of the wheel;
   b. a pendulum member rotatably mounted on said shaft, said pendulum member including an upper limb extending upwardly from said shaft to an upper end, and a lower limb extending downwardly from said shaft to a lower end;
   c. a mass carried on said lower end of said pendulum member tending to maintain said member in vertical attitude; and,
   d. a seat mounted on said upper end of said pendulum member, said seat at least partially overlying the subjacent top portion of the wheel and being movable between a first position spaced above said top portion and a second position in engagement with said top portion under the body weight of a person seated on said seat, the body weight being supported by said wheel.

2. A golf cart seat as in claim 1 wherein the central portion of said pendulum member is formed with a vertical slot defined by an upper wall and a pair of spaced vertical side walls loosely straddling said shaft to afford vertical relative motion between said shaft and said pendulum member.

3. A golf cart seat as in claim 2 wherein said seat is cantilevered from said upper end of said pendulum member and is upwardly inclined in said first position spaced above said top portion.

4. A golf cart seat as in claim 3 wherein said seat is substantially horizontal in said second position in engagement with said top portion of said wheel.

5. A golf cart seat as in claim 4 wherein the junction between the proximal mounting portion of said seat and said upper end of said upper limb is at an elevation below said top portion of said wheel, and wherein said top portion provides a fulcrum for said seat as said seat is moved from said first, upwardly inclined position to said second, substantially horizontal position, said proximal end of said seat being thereby elevated and urging said pendulum member upwardly to separate said upper wall of said slot from said shaft.

6. A golf cart seat as in claim 5 wherein at least the portion of said supper limb adjacent said proximal mounting portion of said seat is flexible.

7. A golf cart seat as in claim 2 including an enlarged head on the distal end of said shaft, and wherein the bottom end of said vertical slot is enlarged sufficiently to insert said pendulum member over said head of said shaft, said head being larger than the width of said vertical slot and being thereby effective to limit the movement of said pendulum member in a direction toward said distal end of said shaft when said head covers any portion of said vertical slot.

* * * * *